Feb. 16, 1960 M. N. SILVER 2,925,007
OPTICAL DEVICE FOR MEASURING GAS PRESSURE
Filed June 21, 1956 2 Sheets-Sheet 1

MARVIN N. SILVER,
INVENTOR
BY Ralph E. Bitner
ATTORNEY

Feb. 16, 1960 — M. N. SILVER — 2,925,007
OPTICAL DEVICE FOR MEASURING GAS PRESSURE
Filed June 21, 1956 — 2 Sheets-Sheet 2

MARVIN N. SILVER
INVENTOR

BY Ralph E. Bitner
ATTORNEY

United States Patent Office 2,925,007
Patented Feb. 16, 1960

2,925,007

OPTICAL DEVICE FOR MEASURING GAS PRESSURE

Marvin N. Silver, New York, N.Y., assignor, by mesne assignments, to Tung-Sol Electric Inc., Newark, N.J., a corporation of Delaware Application June 21, 1956, Serial No. 592,892

4 Claims. (Cl. 88—14)

This invention relates to a gas pressure measuring device which provides an instant indication of the pressure or gas density within an enclosure. It has particular reference to a pressure measuring device which obtains the pressure within an enclosure without mechanical or fluid connection to the volume within the enclosure.

Many sensitive pressure measuring devices have been designed and employed for the measurement of reduced pressures within an enclosure. All of these devices require a pipe connection to the enclosure or else employ a mechanical contrivance positioned within the enclosure and connected to external indicating means. Many of these prior art devices, particularly the more sensitive ones, require a cyclic manipulation by an operator before the pressure can be measured and therefore a considerable time elapses before a pressure sample is made and the reading is determined. The present invention employs no pipe connection between the gas inside the enclosure and the measuring device. It does not require any mechanical nor chemical equipment within the enclosure. The pressure measuring operation depends entirely upon the amount of light scattered from a beam of light rays projected into the enclosure and for this reason the determinations of pressure can be made instantly by suitable light detecting instruments placed outside the enclosure.

The present invention employs a transducer which receives light energy and transforms it into electrical energy. In the specification and claims which follow this transducer is designated a "photoelectric means." It is to be understood that this designation includes all transducers which transform light into electricity. These include photoconductive cells, photoelectric cells, photomultiplier tubes, and all types of crystal and semi-conductor elements whose electric properties vary with incident light energy.

One of the objects of this invention is to provide an improved gas pressure measuring device which avoids one or more of the disadvantages and limitations of prior art arrangements.

Another object of the invention is to measure the gas pressure within an enclosure without any mechanical or fluid connection to the enclosed volume.

Another object of the invention is to provide a gas pressure measuring device which responds instantly to variations of gas pressure.

Another object of the invention is to provide a pressure measuring device for gaseous discharge devices employing a transparent envelope and operating on a schedule of cyclic conductive pulses.

Another object of the invention is to increase the sensitivity of pressure measuring devices so that pressures as low as $10^{-11}$ mm. of mercury can be measured.

The invention comprises a source of light which projects a parallel beam into an enclosure having a gas pressure to be measured. A photoelectric means is positioned in alignment with an optical collimating means disposed at an angle with the first beam of light for receiving the scattered light therefrom. The amplitude of the pulses received from the photoelectric means is a measure of the gas pressure within the enclosure. For enclosures passing pulsed electric currents, a system of synchronized blanking pulses are employed to disable the photoelectric means when there is current passing through the enclosure. An indicating means connected to the photoelectric means shows the pressure.

The phenomenon of light scattering by gas molecules is well-known and its characteristics have been determined. A beam of light passing through a gas will be scattered at random by the gas atoms in accordance with the following formula.

$$i = I_0 \frac{k(1+\cos^2 \Theta)n}{\lambda^4} \phi$$

where $\Theta$ is the angle between the incident and scattered light; $I_0$ is the incident intensity; $i$ is the intensity of the scattered light into a solid angle $\phi$; $n$ is the density of the gas particles; $\lambda$ is the wave length of the incident light; and $k$ is a constant which depends upon the nature of the gas particles. This formula holds if the dimensions of the gas particles are small compared with $\lambda$, the wave length of the light. When a mixture of gasses is used or when the gas is composed of large molecules the scattering is still proportional to the gas density.

For a better understanding of the present invention, together with other and further objects thereof, reference is made to the following description taken in connection with the accompanying drawings.

Figure 1:
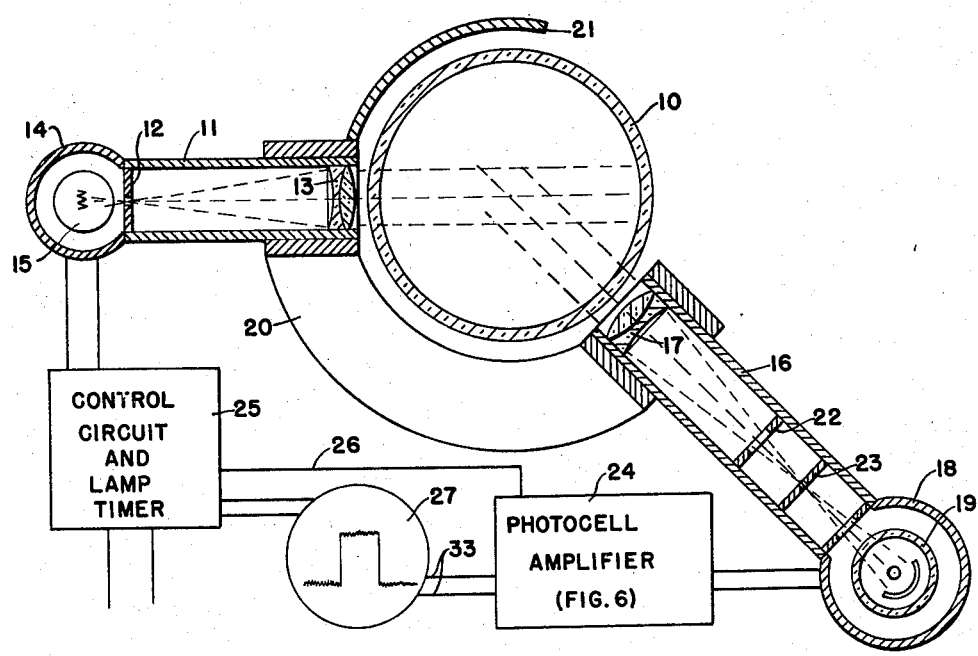
Fig. 1 is a cross sectional view of the apparatus positioned for measuring the gas pressure within an enclosure, showing some of the circuit arrangements in block form.

Referring now to the drawings, an enclosure 10 is shown in Fig. 1 which contains a gas pressure to be measured. A collimator tube 11 includes a diaphragm member 12 having a small slit and a lens system 13 for rendering the light which comes through the slit parallel and directed toward the center of container 10. A lamp housing 14 containing a lamp 15 is mounted adjacent to the diaphragm and provides the light for illuminating the gas within the enclosure 10.

As shown in Fig. 1, a receiving collimator tube 16 includes a lens system 17, a mounting for a photoelectric cell 19, and a light-tight housing 18. The two collimator tubes are secured to a base 20 and a light shield 21 is secured to a portion of ahe base 20 for masking the light from outside sources which otherwise might enter the collimator lens 17 and produce an erroneous determination of pressure. Collimator tube 16 is provided with a plurality of diaphragms 22 and 23 for cutting out all ambient light and providing that only the light from the scattered gas molecules enters the photomultiplier cell 19.

The photomultiplier cell is connected to an amplifier 24 and a control circuit 25. The photocell amplifier is shown in detail in Fig. 6 and has provision for blanking or for rendering the photocell amplifier nonconductive during a predetermined sequence of time intervals. The control for this blanking pulse is transmitted from the control circuit 25 over conductor 26 to a control electrode in the photocell amplifier as will be explained in detail hereinafter.

The output of the photocell amplifier is applied to a cathode ray display tube 27 having a scanning voltage which is derived from the control circuit 25.

Figure 2:
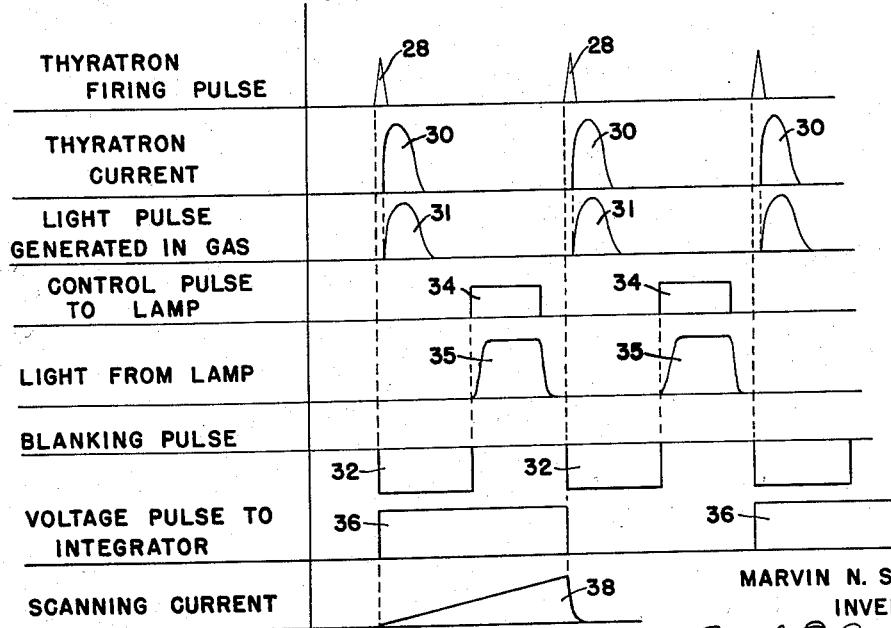
Fig. 2 is a graph showing the timing of the light and electrical pulses employed when a gaseous discharge device is being operated and its gas pressure measured.

Fig. 2 shows a timing schedule for operation with a thyratron tube discharge device which generates considerable light during a pulsed conduction period. The firing pulses 28 produce anode-cathode currents 30 which provide light pulses 31 within the tube during a period which generally consumes about half the time interval between firing pulses. During this interval a blanking pulse 32 maintains the photocell amplifier 24 in a nonconductive condition and prevents light pulses 31 from producing any output voltage between conductors 33 which connect the output of the photocell amplifier to the display device 27. At the termination of each blanking signal 32 a control pulse 34 is sent to the lamp 15 and the lamp is lighted, producing a pulse of light 35. This light pulse is scattered by the gas molecules in enclosure 10 and the scattered light is received by lens system 17 and focussed on a small aperture in diaphragm 23 and on the cathode of the photomultiplier tube 19.

The blanking pulse 32 starts another voltage pulse 36 which is maintained until a second blanking pulse is received. This pulse 36 is applied to a well-known integrator circuit (Fig. 7) and produces a saw-tooth wave 38 which is used for scanning purposes in cathode ray tube 27.

Figure 3:
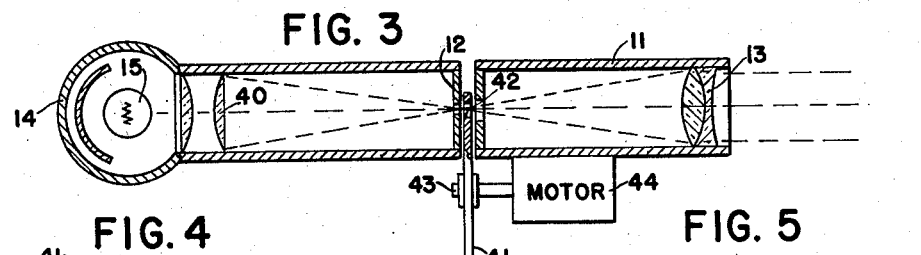
Fig. 3 is a cross sectional view of an alternate system of providing light pulses for the enclosure.
Figure 4:
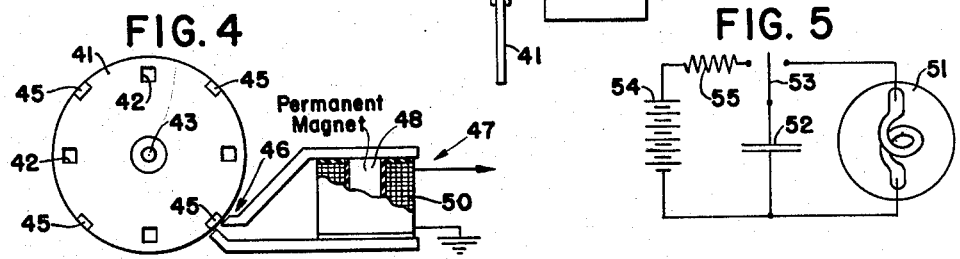
Fig. 4 is a synchronizing wheel which may be used to provide light pulses and also to provide synchronizing pulses for the signal used to disable the photoelectric amplifier.

In the event that thyratrons are not being measured and the enclosure whose gas pressure is to be measured does not give off any light nor include any source of firing pulses, it has been found expedient to employ light pulses because of the comparative ease of eliminating the influence of outside sources of light. To this end the device shown in Figs. 3 and 4 is employed. It comprises the usual lamp 15 with a condensing lens 40 and a diaphragm 12. Adjacent to the diaphragm 12 is a slotted disk 41 containing slots 42 and rotatable on a shaft 43 which may be turned by a motor 44. In order to provide synchronization of the transmitted light pulses with the blanking and scanning currents, a plurality of soft iron inserts 45 are positioned around the periphery of the wheel 41 and are arranged to pass adjacent to pole pieces 46 which are part of a magnetic circuit 47 containing a permanent magnet 48 and a winding 50. It will be obvious that when the wheel 41 is rotated, a voltage pulse is generated each time an iron insert 45 passes adjacent to the pole pieces 46. This pulse is transmitted to the control circuit 25 on the same conductor which carries the firing pulse 28 and thereafter performs the same function.

Figure 5:
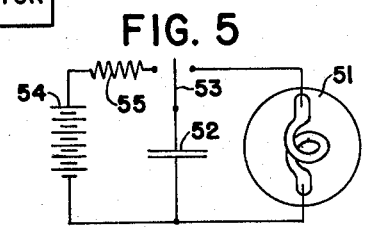
Fig. 5 is a schematic diagram of connections showing how a high intensity discharge lamp may be connected for periodic discharge by a synchronous switch.

In some applications of this device where an exceptionally strong light pulse is necessary the circuit shown in Fig. 5 may be employed. In this case a high intensity flash lamp 51 is employed and receives its current from the discharge of a capacitor 52 through a switch 53. The capacitor 52 is charged by a battery 54 in series with a resistor 55, this type of circuit being well-known in the art.

Another convenient means of obtaining light pulses and receiving only pulses of scattered light which coincide with the incident pulses is to employ two slotted wheels run by the same motor or by synchronous motors. The incident collimator is the same as shown in Fig. 3. The pick up collimator is similar to that shown in Fig. 1 except that a slotted wheel similar to wheel 41 shown in Fig. 3 is mounted adjacent to diaphragm 23 and rotates so as to admit light only when light is transmitted through tube 11.

Figure 6:
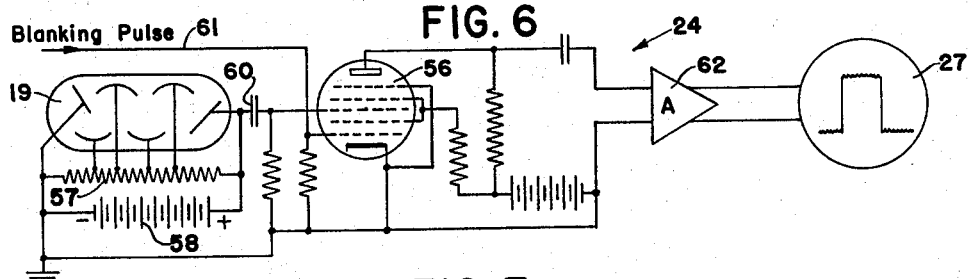
Fig. 6 is a schematic diagram of connections indicating the manner in which a photomultiplier tube may be connected to a penta-converter tube which is controlled by a blanking pulse.

The circuit shown in Fig. 6 is the photocell amplifier 24 and includes a photomultiplier cell 19 connected to a pentaconverter tube 56. The photomultiplier tube contains the usual anode and cathode plus a plurality of dynodes, each supplied with a voltage from a voltage divider 57 which is connected across a source of potential 58. The anode of the photomultiplier tube is connected through a coupling capacitor 60 to one of the control electrodes of amplifier tube 56, the second control electrode being connected to a conductor 61 which carries the blanking pulse. The anode of tube 56 is coupled to a conventional amplifier circuit 62 and then applied to the cathode ray tube 27.

Figure 7:
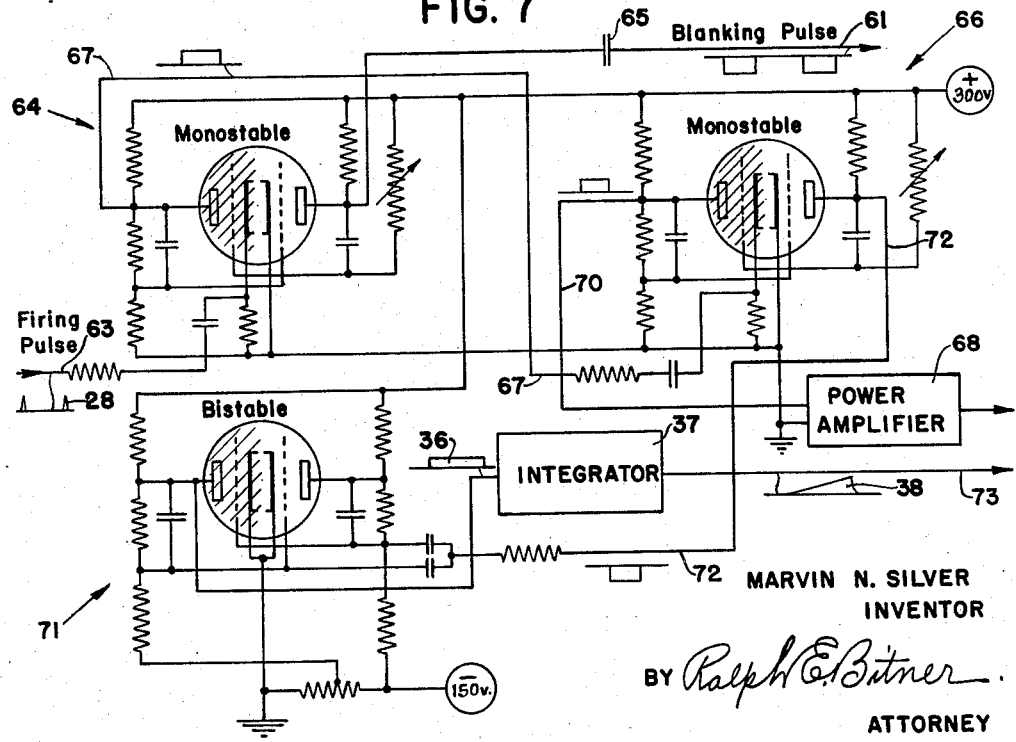
Fig. 7 is a schematic diagram of connections indicating the manner in which two monostable multivibrator stages are employed to produce the blanking pulse for the photocell amplifier. This figure also contains a bistable double triode circuit which is used to supply an integrator circuit with a pulse which may be employed to produce the scanning voltage for a cathode ray tube.

Fig. 7 shows the details of the three multivibrator circuits which produce the control pulses necessary for the operation of the device. The firing pulse 28 is derived from a thyratron circuit or from another control circuit such as winding 50. These pulses are applied to conductor 63 which is connected to one of the cathodes of a monostable multivibrator circuit 64. This type of circuit is well-known in the art and transfers conductance from one triode to another when triggered by a control pulse. In the circuit 64, at the start of a cycle of operations, conduction is on the left side, as indicated by the cross-hatched lines. When a positive pulse is applied over conductor 63 to the cathode, conduction is transferred to the right side for a definite period of time and then, without further actuation, conduction is returned to the left. A conductor connected to the right anode, with a blocking capacitor 65, produces a series of negative square-topped pulses 32 (Fig. 2) which are applied over conductor 61 to the first grid of the pentaconverter tube 56 and act as a blanking signal; that is, during the duration of the pulse, the tube conduction is cut off and no signal is produced in the anode circuit.

Circuit 64 is also employed to control a second monostable multivibrator circuit 66 which is normally conducting on its left side as shown in Fig. 7. Control signals are derived from the left anode of circuit 64 and transferred over conductor 67 to the left cathode of the tube in circuit 66. This signal triggers the tube and conduction is transferred to the right side, then back to the left, producing a positive-going signal at the left anode which is transferred to a power amplifier 68 by way of conductor 70. The phase and duration of the control signal on conductor 70 is shown as a square-topped pulse 34 in Fig. 2. The output of the power amplifier is connected to the lamp 15 and controls its light pulses.

Circuit 66 is also employed to control a third multivibrator circuit 71 which produces a square-topped wave 36 (see Fig. 2) for controlling an integrator circuit 37. Control pulses for operating circuit 71 are obtained from the right anode of circuit 66 and are transferred over conductor 72 to both control electrodes of the tube in circuit 71. Circuit 71 is a bistable multivibrator which at the start of any cycle of operations is conducting on the left side because of the more positive bias applied to the left control electrode. A single negative pulse transfers conduction to the right side and then a second negative pulse (both over conductor 72) transfers conduction back to the left side. The output of the integrator circuit is applied over conductor 73 to a scanning control in conjunction with the oscillograph cathode ray tube 27 to provide a visual display on the screen which shows the magnitude of the scattered light and gives a value which is proportional to the gas density and pressure.

While there have been described and illustrated specific embodiments of the invention, it will be obvious that various changes and modifications can be made therein without departing from the field of the invention which should be limited only by the scope of the appended claims.

I claim:

1. A device which measures scattered radiation and determines thereby the gas pressure within a closed transparent envelope comprising, a source of intermittent light pulses with focussing means for directing a light beam into said envelope, a photoelectric means positioned off the axis of said beam with focussing means for exclusively selecting a portion of the space traversed by said beam and detecting scattered radiation from the molecules in said gas, coupling means connected to the photoelectric means for deriving signals therefrom which are proportional to the scattered radiation in said space, electric circuit means for applying a blanking signal to said coupling means for eliminating photoelectric signals which are not in synchronism with said light pulses, electric circuit means controlling said source of light to produce light pulses only when no other source of light is present in the envelope, and a calibrated display means connected to said coupling means which indicates the gas pressure within the envelope.

2. A device as set forth in claim 1 wherein said coupling means includes a vacuum tube amplifier.

3. A device as set forth in claim 1 wherein said calibrated display includes a cathode ray oscillograph tube.

4. A device as set forth in claim 1 wherein said transparent envelope contains thyratron tube components and said circuit means controlling the source of light is coupled to a thyratron operating circuit.

References Cited in the file of this patent

UNITED STATES PATENTS 2,775,159 Frommer _____ Dec. 25, 1956

OTHER REFERENCES

Cage: Theory and Application of Industrial Electronics, McGraw-Hill Book Co., Inc., New York, first edition (1951), pages 254–256, 263–265.

"A Forward Angle Light Scattering Camera for Determining Size Distribution in Aerosols" (Lee and La Mer), The Review of Scientific Instruments; volume 25, number 10; October 1954; pages 1004–1010.